United States Patent [19]

Umezawa

[11] Patent Number: 4,811,100
[45] Date of Patent: Mar. 7, 1989

[54] PICTURE-QUALITY CORRECTION CIRCUIT

[75] Inventor: Toshimitsu Umezawa, Kazo, Japan

[73] Assignee: Kabushiki Kaisha Toshiba, Kawasaki, Japan

[21] Appl. No.: 908,654

[22] Filed: Sep. 18, 1986

[30] Foreign Application Priority Data

Sep. 30, 1985 [JP] Japan .................. 60-216395

[51] Int. Cl.$^4$ .............................................. H04N 5/14
[52] U.S. Cl. ...................... 358/166; 358/162
[58] Field of Search ............ 358/160, 166, 182, 162, 358/37

[56] References Cited

U.S. PATENT DOCUMENTS

| | | | |
|---|---|---|---|
| 4,541,014 | 9/1985 | Yagi | 358/166 |
| 4,647,960 | 3/1987 | Miura | 358/166 |
| 4,654,709 | 3/1987 | Umezawa | 358/162 |
| 4,654,711 | 3/1987 | Mikado | 358/160 |
| 4,658,295 | 4/1987 | Umezawa | 358/166 |
| 4,665,432 | 3/1987 | Shima | 358/37 |

FOREIGN PATENT DOCUMENTS

3140761 4/1983 Fed. Rep. of Germany .

*Primary Examiner*—Tommy P. Chin
*Attorney, Agent, or Firm*—Cushman, Darby & Cushman

[57] ABSTRACT

A contour correction circuit applies a preshoot and overshoot to the rising and falling edges of an original signal waveform and supplies a contour-corrected signal with an emphasized contour, as a first signal, to maximum level circuits. The original signal which is time-advanced ahead of the first signal is supplied as a second signal to the maximum level circuit. The original signal, time-delayed by a delay element behind the first signal, is supplied as a third signal to the maximum level signal. The first and third signals are supplied to a maximum level circuit. The output of the maximum level circuits is supplied to a minimum level circuit. The minimum level circuit produces an output signal with the preshoot and overshoot of the first signal eliminated and with the rising and falling edges sharply defined with respect to the original signal.

7 Claims, 10 Drawing Sheets

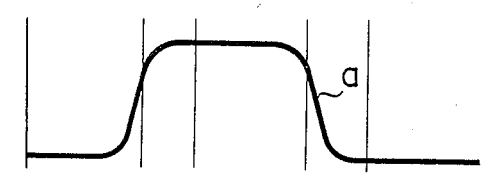
F I G. 4A
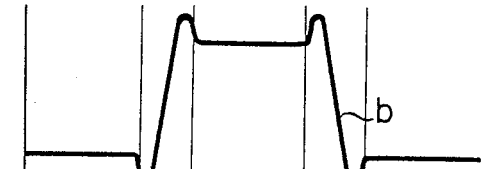
F I G. 4B
F I G. 4C
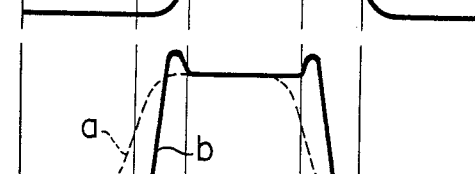
F I G. 4D'
F I G. 4D
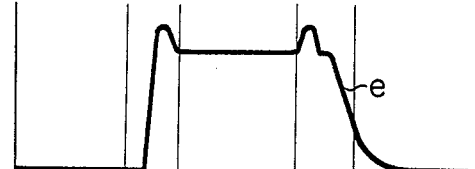
F I G. 4E
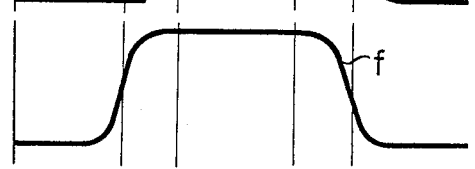
F I G. 4F
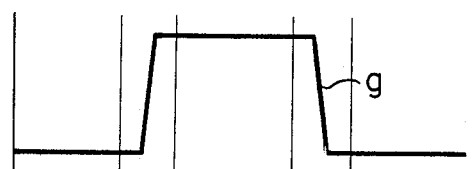
F I G. 4G F I G. 9A 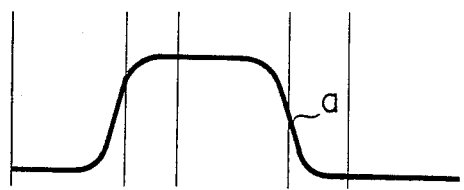
F I G. 9B 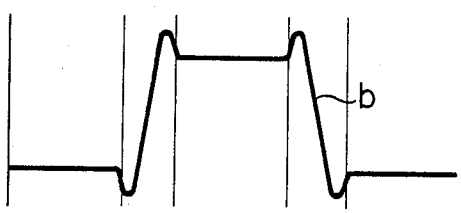
F I G. 9C 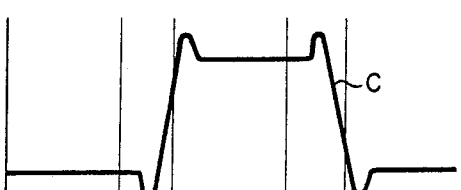
F I G. 9D 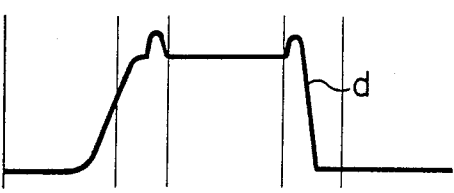
F I G. 9E 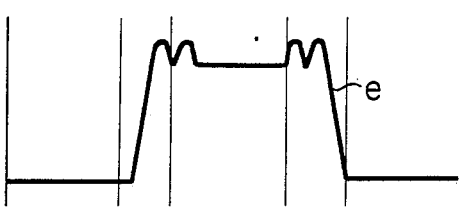
F I G. 9F 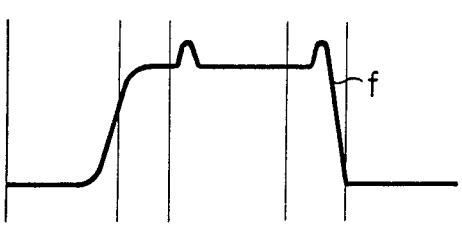
F I G. 9G 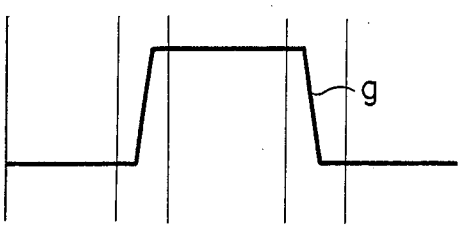

F I G. 11A 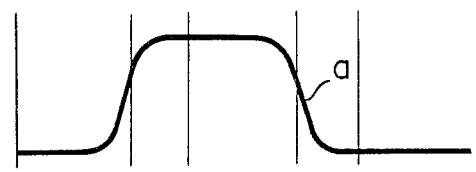
F I G. 11B
F I G. 11C 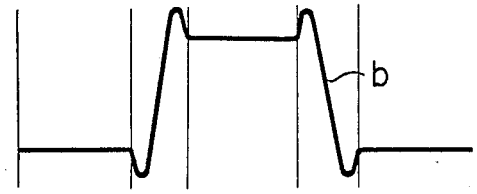
F I G. 11D
F I G. 11E 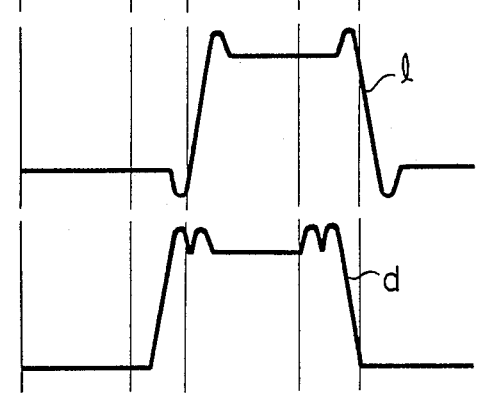
F I G. 11F
F I G. 11G 
F I G. 11H 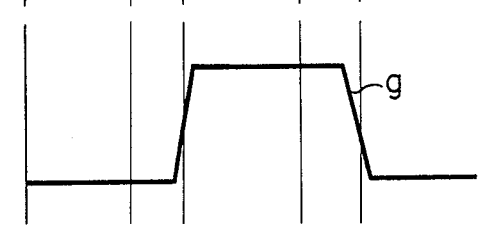

PICTURE-QUALITY CORRECTION CIRCUIT

BACKGROUND OF THE INVENTION

This invention relates to a video signal processing circuit of, for example, a color television receiver and in particular, to a circuit for correcting a picture quality.

In a video signal processing circuit of a color television receiver, a distributed capacitance between connection lines increases due to the number of amplifier stages and additional circuits, resulting in a loss in a broadband component of the video signal and a lowered resolution of the eventual image. Even in an ideal transmission system which is free from any picture-quality degeneration, the reproduced image has less sharpness due to its restricted transmission band.

In order to correct such a lowered image sharpness, a contour correction circuit has been used as an image correction circuit. An image contour becomes more clearly defined through the application of a preshoot and overshoot to a video signal. The contour correction circuit comprises a second derivative circuit for differentiating an input signal twice, and an adder for adding together the input signal and twice-differentiated output signal. In the contour correction circuit, the rise and fall times of an output video signal are made shorter in the edges of its waveform, noting that the "rise time" is a time taken for the signal level to rise from 10 % to 90 % and that the "fall time" is a time taken for the signal level to fall from 90 % to 10 %. Thus the frequency band emerges as being apparently broader.

In this contour correction circuit, the rise and fall times of a video signal can be reduced at the edges of its waveform. In this case a preshoot and overshoot are applied to the edges of the signal waveform and an excessive contour correction is achieved. As a result, a black-and-white edge mark is formed on the reproduced image, thus presenting a "distorted image" problem.

SUMMARY OF THE INVENTION

It is accordingly the object of this invention to provide a picture-quality correction circuit which can shorten the rise and fall times of a contour-corrected video signal at the edges of its waveform without applying any preshoot and overshoot thereto and can make these edges of the signal sharp and can thus extend an apparent transmission band, whereby a picture-quality can be improved.

According to this invention, a picture quality correction circuit is provided which comprises:

first circuit means including a contour correction circuit for adding a preshoot and overshoot signal to rising and falling edges of an original signal waveform to obtain a contour-corrected signal having an emphasized contour and at least one delay means, and generating a first signal having a waveform equal to that of the contour-corrected signal, second signal time-advanced ahead the first signal and third signal time-delayed behind the first signal, said second and third signals being equal in their waveform to either one of said original signal or said first signal; and second circuit means receiving the first, second and third signals and generating an output signal with the preshoot and overshoot eliminated and with the rising and falling edges sharply defined.

BRIEF DESCRIPTION OF THE DRAWINGS

FIGS. 4A to 4G are waveforms for explaining the operation of associated circuit elements in the first embodiment of this invention;

FIGS. 9A to 9B are waveforms for explaining the operation of associated circuit elements in the third embodiment of this invention;

FIGS. 11A to 11H are waveforms for explaining the operation of associated circuit elements in the fourth embodiment of this invention;

DETAILED DESCRIPTION OF THE PREFERRED EMBODIMENTS

A picture-quality correction circuit according to one embodiment of this invention will be explained below with reference to the accompanying drawings.

Figure 1:
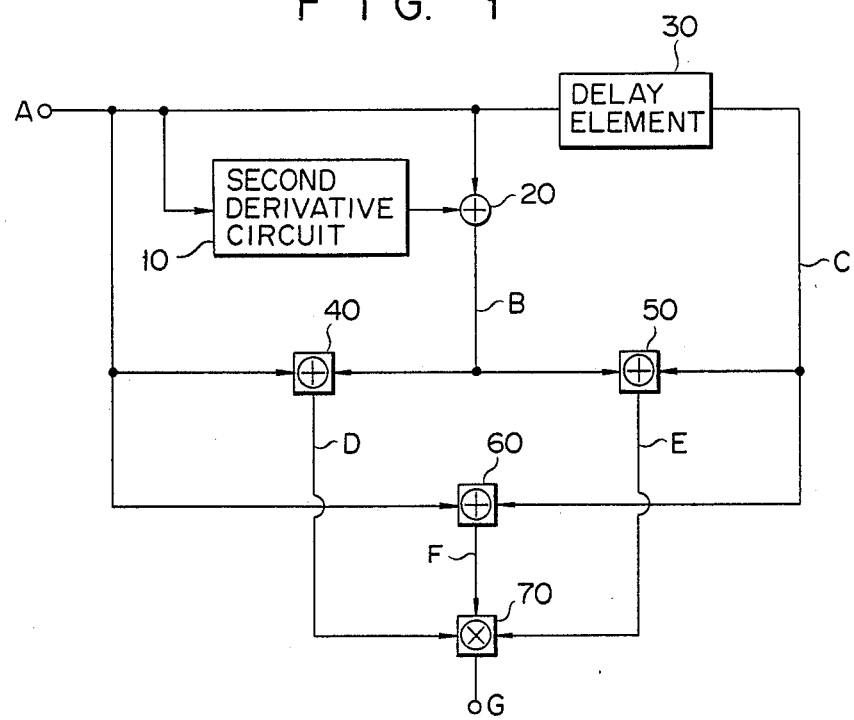
FIG. 1 is a circuit diagram showing a picture-quality correction circuit according to a first embodiment of this invention.

FIG. 1 is a block diagram showing a picture-quality correction circuit according to one embodiment of this invention. A video signal from an input terminal A is supplied to a contour correction circuit for producing a contour-emphasized correction signal with a preshoot and overshoot added to the rising and falling edges of that input signal. The contour correction circuit comprises, for example, second derivative circuit 10 and adder 20. The input video signal is supplied to an input terminal of second derivative circuit 10. The twice differentiated output of second derivative circuit 10, together with the input video signal from the input terminal A, is supplied to adder 20. Adder 20 produces an output signal from its output terminal B.

The video signal from the input terminal A is supplied to delay element 30, and thus a delayed replica of the input video signal is delivered from an output terminal C of delay element 30, in which case that delay time is selected as being substantially equal to a delay time of the contour correction circuit comprised of second derivative circuit 10 and adder 20.

The input video signal from the input terminal A, together with the output signal of adder 20, is supplied to maximum level circuit 40. A signal corresponding to the maximum levels of both the signals is delivered from an output terminal D of maximum level circuit 40. The output signal from the output terminal B of adder 20 and output signal from the output terminal C of delay element 30 are input to maximum level circuit 50. An output signal corresponding to the maximum levels of both the signals is delivered from the output terminal E of maximum level circuit 50. The signal from the input terminal A and signal from the output terminal C of delay circuit 30 are supplied to maximum level circuit 60. An output corresponding to the maximum levels of both the signals is delivered from the output terminal F of maximum level circuit 60. The signals from the output terminals D, E and F of maximum level circuits 40, 50 and 60, respectively, are supplied to minimum level circuit 70. An output signal corresponding to the minimum levels of these three signals is delivered from the output terminal G of minimum level circuit 70.

Figure 2A:
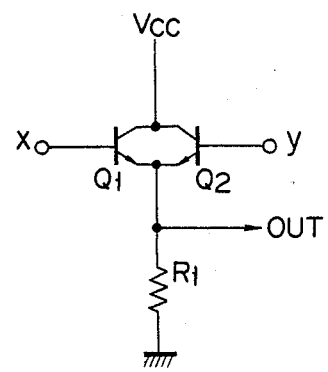
FIGS. 2A and 2B show one form of a maximum level circuit in the arrangement of FIG. 1.

FIG. 2A is a circuit diagram showing one form of maximum level circuits 40, 50 and 60. The maximum level circuit includes two NPN type transistors $Q_1$ and $Q_2$ having commonly connected collectors and commonly connected emitters. The commonly connected connectors of transistors $Q_1$ and $Q_2$ are connected to a DC voltage supply terminal Vcc. The commonly connected emitters of transistors $Q_1$ and $Q_2$ are connected to a ground terminal through resistor $R_1$. A higher level of an input signal supplied to a base input terminal x of transistor $Q_1$, and input signal supplied to a base input terminal y, is delivered from a junction of the commonly connected emitters of transistors $Q_1$ and $Q_2$.

Figure 3A:
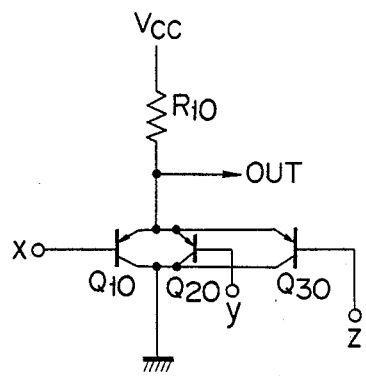
FIGS. 3A and 3B show one form of a minimum level circuit in the arrangement of FIG. 1.

FIG. 3A shows one form of minimum level circuit 70. This circuit includes three PNP type transistors $Q_{10}$, $Q_{20}$ and $Q_{30}$ having commonly connected collectors and commonly connected emitters. The commonly connected emitters of these transistors are connected to a DC voltage supply terminal Vcc through resistor $R_{10}$ and commonly connected collectors of these transistors are connected to a ground terminal. A minimum level of three input signals supplied to base terminals x, y and z of transistors $Q_{10}$, $Q_{20}$ and $Q_{30}$ is delivered from a junction of their commonly connected emitters.

The operation of the circuit of FIG. 1 will be explained below with reference to FIGS. 4A to 4G. Where a video signal a having a waveform as shown in FIG. 4A is supplied to the input terminal A, a signal b from the output terminal B of adder 20 has a waveform as shown in FIG. 4B and delay signal c from the output terminal C of delay element 30 has a waveform as shown in FIG. 4C.

Since maximum level circuit 40 delivers the higher level portions (to be exact, signal portions not having a lower level) of input signals a and b as a signal d, the signal d from the output terminal D of maximum level circuit 40 has a waveform as shown in FIG. 4D. As seen from FIGS. 4D' and 4D, the signal d as shown in FIG. 4D consists of a signal portion a as indicated by a dotted line in FIG. 4D' and signal portion b indicated by a solid line (FIG. 4D) above the dotted line. Similarly, since maximum level circuit 50 delivers higher level portions of the signals b and c as an output signal, a signal e from the output terminal E of maximum level circuit 50 has a waveform as shown in FIG. 4E. Similarly, since maximum level circuit 60 delivers the higher level portions of the input signal a and delay signal c as an output signal f, this output signal f is as shown in FIG. 4F. On the other hand, minimum level circuit 70 delivers the lower level portions of three signals d, e and f as a minimum level output signal g. This output signal g from minimum level circuit 70 is as shown in FIG. 4G.

Figure 5:
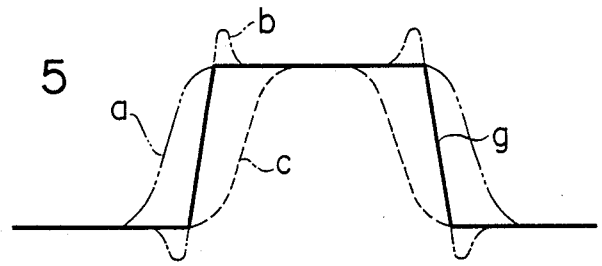
FIG. 5 shows a relation among respective waveforms of the associated circuit elements.

The output signal g corresponds to the intermediate portions of the signals a, b and c, and has neither a preshoot nor an overshoot at the edge of its waveform. Furthermore, the rise and fall times of the output signal g are shorter at its edges than those of the input signal a. A relation among these signals a, b, c and g is as shown i FIG. 5. From this it may be said that the circuit arrangement, including the aforementioned circuit elements 40 to 70, is of such a type as to produce an intermediate level signal with respect to these signals a, b and c.

Figure 6:
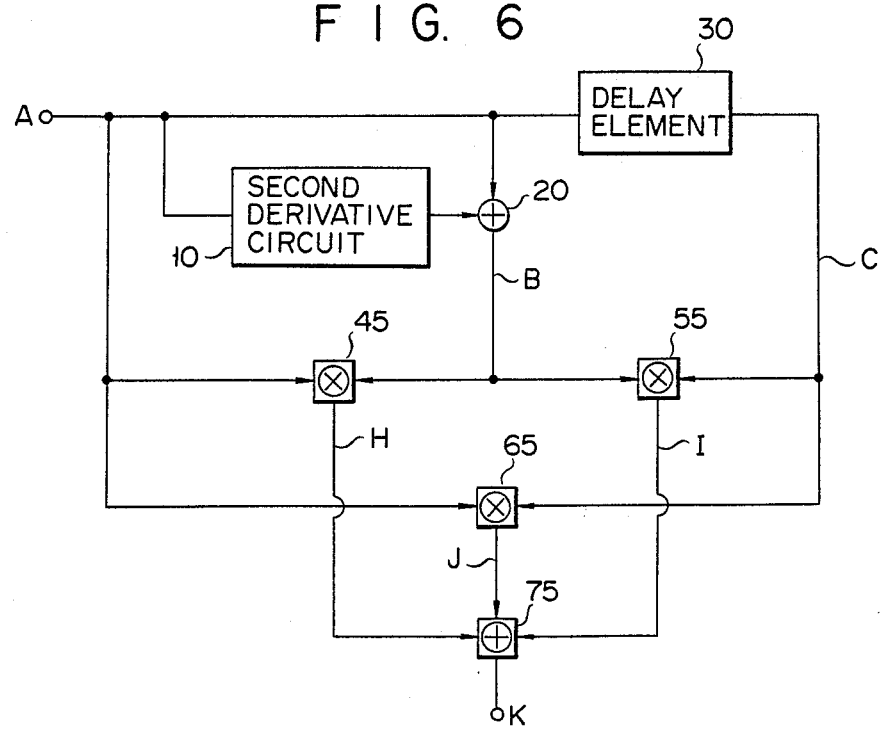
FIG. 6 is a circuit diagram showing a picture-quality correction circuit according to a second embodiment of this invention.

FIG. 6 is a block diagram showing a second embodiment of this invention in which case minimum level circuits 45, 55 and 65 and maximum level circuit 75 are provided in place of maximum level circuits 40, 50 and 60 and minimum level circuit 70 as shown in FIG. 1, respectively.

Figure 2B:
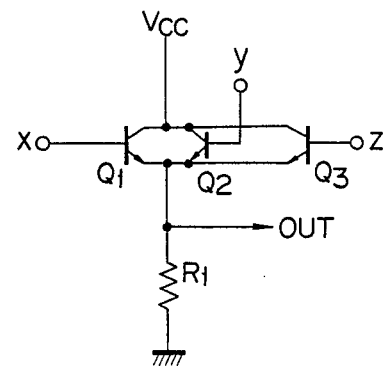
Figure 3B:
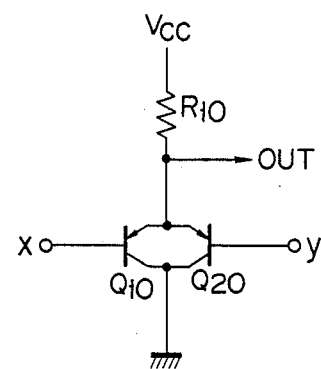

FIG. 2B shows one form of maximum level circuit 75 and FIG. 3B shows one form of minimum level circuits 45, 55 and 65. As seen from FIG. 2B, maximum level circuit 75 is of such a type that NPN type transistor $Q_3$ is added to the circuit and that an input signal z is supplied to the base of the transistor $Q_3$ shown in FIG. 2A. As appreciated form FIG. 3B, minimum level circuits 45, 55 and 65 are of such a type that PNP type transistor $Q_{30}$ is eliminated from the circuit shown in FIG. 3A.

Figure 7A:
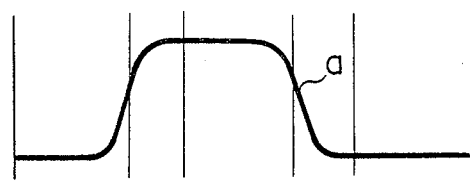
FIGS. 7A to 7G are waveforms for explaining the operation of associated circuit elements in the second embodiment of this invention.
Figure 7B:
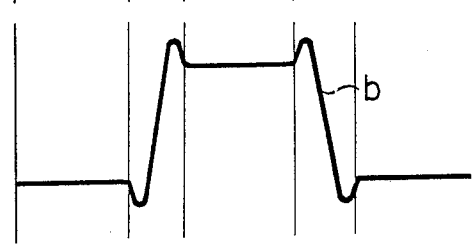
Figure 7C:
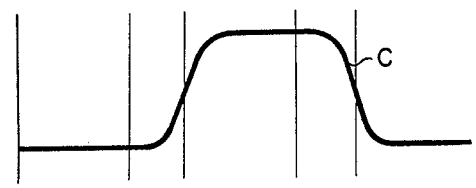
Figure 7D:
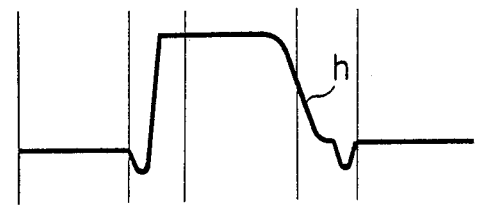
Figure 7E:
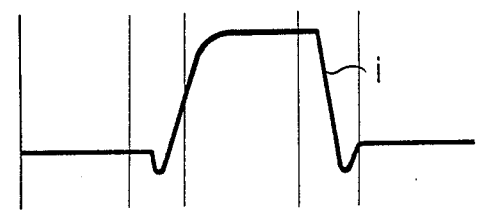
Figure 7F:
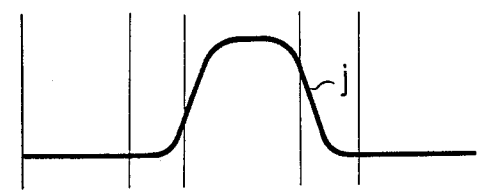
Figure 7G:
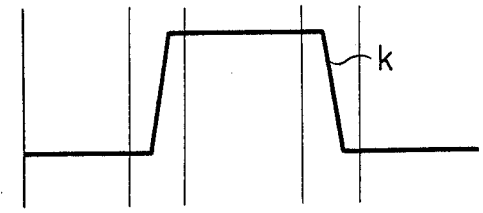

In the circuit arrangement shown in FIG. 6, when a video signal a having a waveform as shown in FIG. 7A is supplied to an input terminal A, a signal b from an output terminal B of adder 20 is as indicated in FIG. 7B and a delay signal c from an output terminal C of delay circuit 30 is as indicated in FIG. 7C. A signal h from an output terminal H of minimum level circuit 45 is as indicated in FIG. 7d. Similarly, a signal i from an output terminal I of minimum level circuit 55 is as indicated in FIG. 7E. Similarly, a signal j from an output terminal J of minimum level circuit 65 is as indicated in FIG. 7F. A signal k from an output terminal K of maximum level circuit 75 is as indicated in FIG. 7G.

Even in the circuit arrangement shown in FIG. 6, an eventual signal involves neither a preshoot nor an overshoot at the edges of its waveform as in the case of the first embodiment of this invention. Furthermore, the rise and fall times of this signal are shorter at their edges than those of the input signal a.

Figure 8:
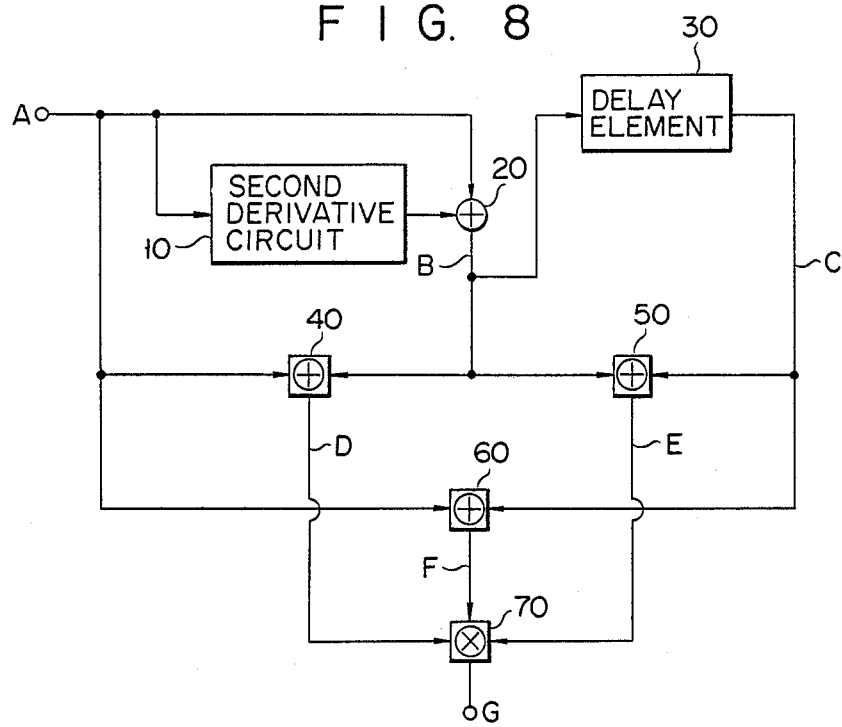
FIG. 8 is a circuit arrangement showing a picture-quality correction circuit according to a third embodiment of this invention.

FIG. 8 is a block diagram showing a third embodiment of this invention. In this embodiment, the input terminal of delay element 30 in FIG. 1 is connected to the output terminal B of adder 20.

In this circuit arrangement, when a video signal a having a waveform as shown in FIG. 9A is supplied to an input terminal A, a signal b from an output terminal B of adder 20 is as indicated in FIG. 9B and a delay signal c from an output terminal C of delay element 30 is as indicated in FIG. 9C. A signal d from an output terminal D of maximum level circuit 40 is as indicated in FIG. 9D. Similarly, a signal e from an output terminal E of maximum level circuit 50 is as indicated in FIG. 9E. Similarly, a signal f from an output terminal F of maximum level circuit 60 is as indicated in FIG. 9F. A signal g from an output terminal G of minimum level circuit 70 is as indicated in FIG. 9G.

Even in the circuit arrangement shown in FIG. 8 an eventual signal contains neither a preshoot nor an overshoot at the edges of its waveform as in the case of the first embodiment of this invention. The rise and fall times of this signal are shorter at their edges than those of the input signal a.

Figure 10:
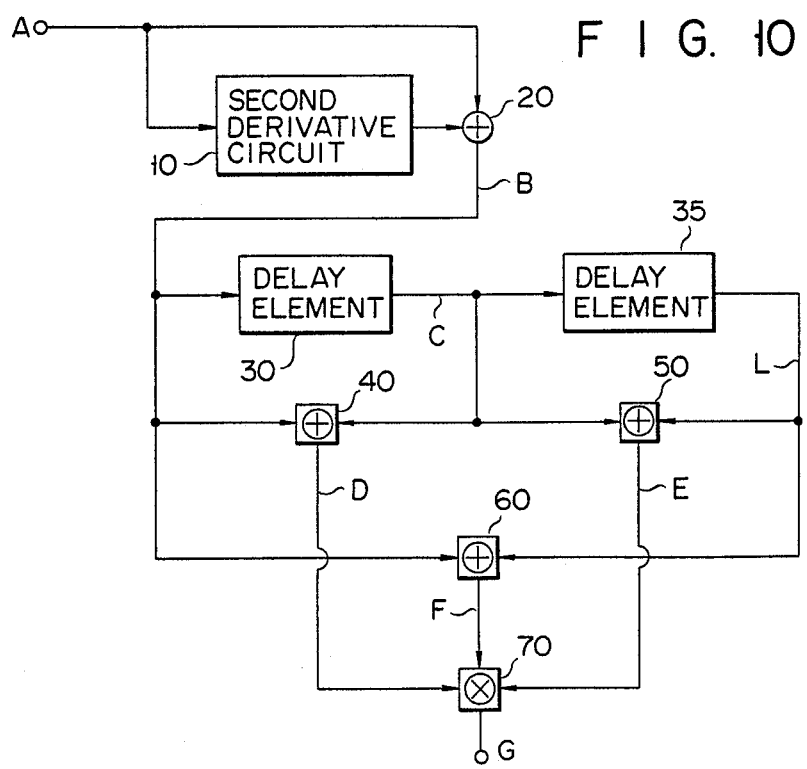
FIG. 10 is a circuit diagram showing a picture-quality correction circuit according to a fourth embodiment of this invention.

FIG. 10 is a block diagram showing a fourth embodiment of this invention in which case a signal b obtained from an output terminal B of adder 20 and delay signal c from delay circuit 30 are coupled to maximum level circuit 40 in place of connecting delay element 30 to the input terminal A in FIG. 1 and delay signal c and delay signal 1 form delay element 35 are coupled to maximum level circuit 50.

In the circuit arrangement shown in FIG. 10, when a video signal a having a waveform shown in FIG. 11A is supplied to the input terminal A, a signal b, delivered from an output terminal B of adder 20, is as indicated in FIG. 11B and a delay signal c, delivered from the output terminal C of delay element 30, is as indicated in FIG. 11C. A signal 1, delivered from an output terminal L of delay element 35, is as indicated in FIG. 11D. A signal d, obtained from an output terminal D of maximum level circuit 40, is as indicated in FIG. 11E. Similarly, a signal e from an output terminal E is as indicated in FIG. 11F. Similarly, a signal f from an output terminal F is as indicated in FIG. 11G. A signal g, supplied from an output terminal G of maximum level circuit 70, is as indicated in FIG. 11H.

Even in the circuit arrangement shown in FIG. 10, the eventual signal contains neither a preshoot nor an overshoot at the edges of its waveform and the rise and fall times of this signal are shorter at the edges of its waveform than those of the input signal a.

Figure 12:
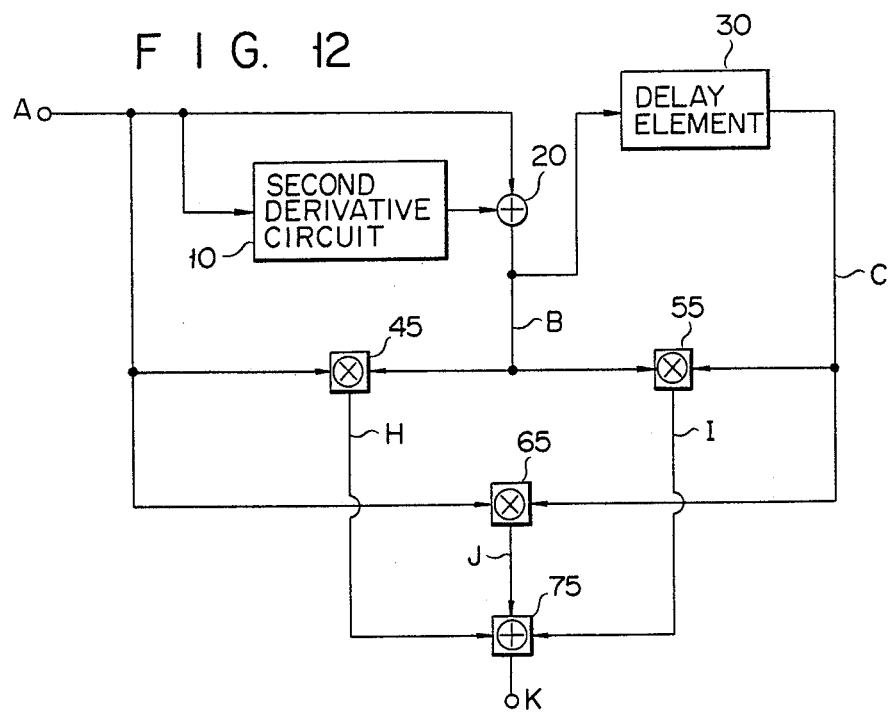
FIG. 12 is a circuit diagram showing a picture-quality correction circuit according to a fifth embodiment of this invention.
Figure 14:
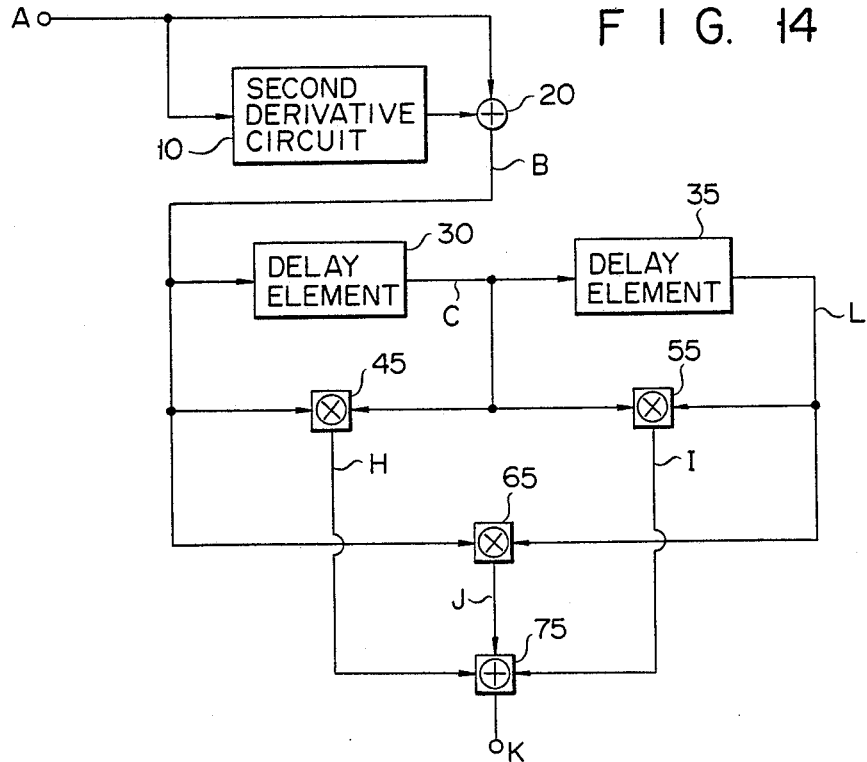
FIG. 14 is a circuit diagram showing a picture-quality correction circuit according to a sixth embodiment of this invention.
Figure 13A:
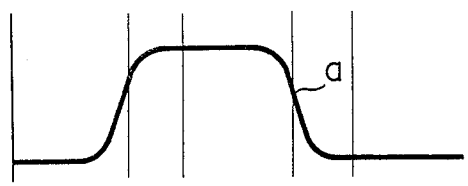
FIGS. 13A to 13G are waveforms for explaining the operation of associated circuit elements in the fifth embodiment of this invention.
Figure 13B:
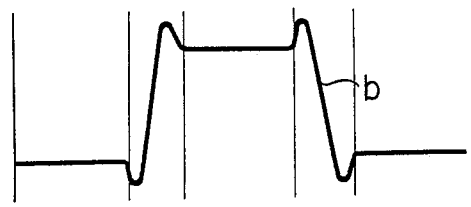
Figure 13C:
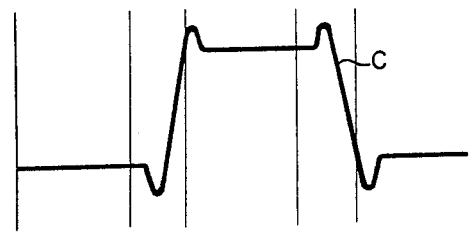
Figure 13D:
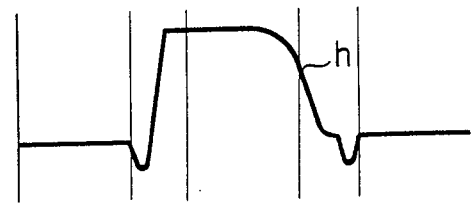
Figure 13E:
Figure 13F:
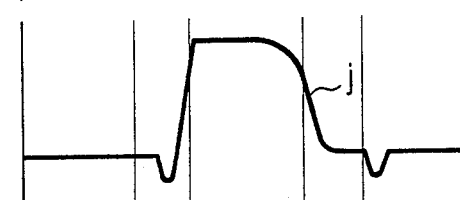
Figure 13G:
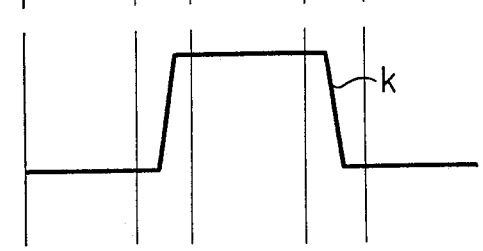
Figure 15A:
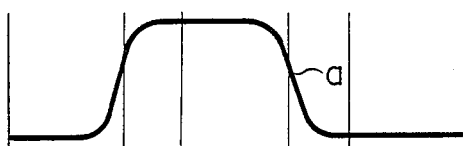
FIGS. 15A to 15H are waveforms for explaining the operation of associated circuit elements in the sixth embodiment of this invention.
Figure 15B:
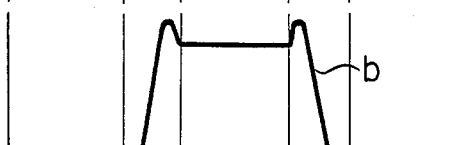
Figure 15C:
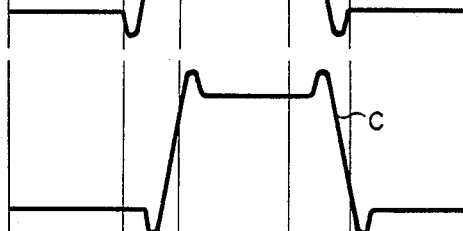
Figure 15D:
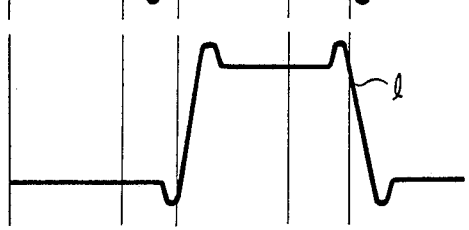
Figure 15E:
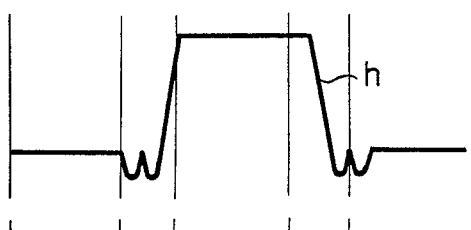
Figure 15F:
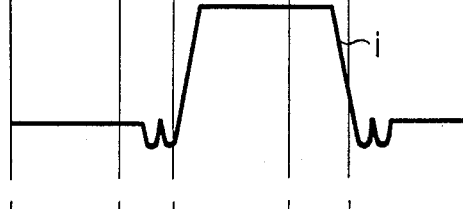
Figure 15G:
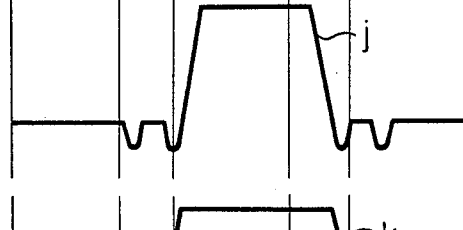
Figure 15H:
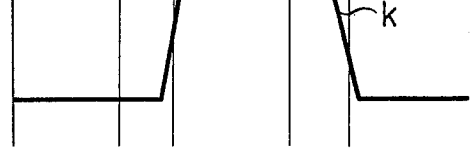

FIGS. 12 and 14 are block diagrams showing fifth and sixth embodiments of this invention, noting that the embodiments of FIGS. 12 and 14 correspond to those of FIGS. 8 and 10, respectively, except that the minimum and maximum level circuits of the fifth and sixth embodiments are replaced by the maximum and minimum level circuits of the third and fourth embodiments, respectively.

The waveforms of the fifth and sixth embodiments are shown in FIGS. 13A to 13G and 15A to 15H, respectively. Even in the fifth and sixth embodiments, their eventual signal contains neither a preshoot nor an overshoot at the edges of their waveform, as in the case of the first embodiment, and the rise and fall times of their signal is shorter at the edges of its waveform than those of the input signal a.

According to this invention, a contour-corrected video signal contains neither a preshoot nor an overshoot at the edges of its waveform and, moreover, the rise and fall times of the eventual signal are made shorter at the edges of its waveform, thus obtaining sharp edges. That is, it is possible to expand an apparent transmission band. It is, therefore, possible to avoid any distorted reproduction image on an image screen which might otherwise be produced as a black-and-white edge mark due to an excessive contour correction. It is, therefore, possible to obtain an improved image sharpness.

Although a combination of second derivative circuit 10 and adder 20 has been explained as being used as a contour correction circuit, this invention is not restricted thereto.

What is claimed is:
1. A picture-quality correction circuit comprising:
   first circuit means, including a) contour correction means for deriving a preshoot and an overshoot of rising and falling edges of an original signal waveform, and for adding said preshoot and said overshoot to said rising and falling edges respectively, to obtain a contour-corrected signal having an emphasized contour, and b) delay means for delaying signals, said first circuit means for generating a first signal having a waveform that is equivalent to a waveform of said contour-corrected signal, a second signal which is advanced in time with respect to the first signal, and a third signal which is delayed in time with respect to the first signal, said second and third signals having waveforms that are equivalent to one of said original signal or said first signal; and
   second circuit means, receiving the first, second and third signals, for generating an output signal with the preshoot and overshoot eliminated and with the rising and falling edges sharply defined,
   wherein said first circuit means includes means for generating a) said contour-corrected signal as said first signal, b) said original signal as said second signal, and c) a delayed signal as said third signal which has been obtained by delaying said original signal by said delay means.
2. A picture-quality correction circuit according to claim 1, in which said second circuit means comprises:
   a first maximum level means for receiving said first and second signals, and for comparing these signals with each other and producing a maximum level signal therebetween;
   a second maximum level means for receiving said first and third signals, and for comparing these signals with each other and producing a maximum level signal therebetween;
   a third maximum level means for receiving said second and third signals, and for comparing these signals with each other and producing a maximum level signal therebetween; and
   a minimum level means for receiving output signals from said first, second and third maximum level, means and for comparing these signals with each other and producing a minimum level signal therebetween as an output signal.
3. A picture-quality correction circuit according to claim 2, in which each said maximum level means comprises two NPN type transistors having their collectors commonly connected to a voltage supply terminal and their emitters commonly connected to a reference potential terminal through an emitter resistor, in which different signals between which a maximum is to be determined are input to the corresponding bases of these transistors to permit a maximum level signal to be taken from a junction of the commonly connected emitters of these transistors.
4. A picture-quality correction circuit according to claim 2, in which said minimum level means includes three PNP type transistors having their collectors commonly connected to a reference potential terminal and their emitters commonly connected to a voltage supply terminal through an emitter resistor, in which signals between which a minimum is to be determined are input to the corresponding bases of these transistors and a minimum level signal is taken from a junction of the commonly connected emitters of these transistors.

5. A picture-quality correction circuit according to claim 1, in which said second circuit means comprises:
- first minimum level means for receiving said first and second signals, comparing these signals with each other and producing a minimum level signal therebetween;
- second minimum level means for receiving said first and third signals, comparing these signals with each other and producing a minimum level signal therebetween;
- third minimum level means for receiving said second and third signals, comparing these signals with each other signal and producing a minimum level signal therebetween; and
- maximum level means for receiving output signals from said first, second and third minimum level, means comparing these signals with each other and producing a minimum level signal therebetween as an output signal.

6. A picture-quality correction circuit according to claim 5, in which each said maximum level means includes three NPN type transistors having their collectors commonly connected to a voltage supply terminal and their emitters commonly connected to a reference potential terminal through an emitter resistor, in which signals between which a maximum is to be determined are input to the corresponding bases of these transistors to permit a maximum level signal to be taken from a junction of the commonly connected emitters of these transistors.

7. A picture-quality correction circuit according to claim 5, in which each said minimum level means comprises two PNP type transistors having their collectors commonly connected to a reference potential terminal and their emitters commonly connected to a voltage supply terminal through an emitter resistor, in which signals between which a minimum is to be determined are input to the corresponding bases of these transistors and a minimum level signal is taken from a junction of the commonly connected emitters of these transistors.

* * * * *